(12) United States Patent
Korenkiewicz et al.

(10) Patent No.: US 9,346,028 B2
(45) Date of Patent: *May 24, 2016

(54) EXPANDED COLOR SPACE ARCHITECTURAL PAINT AND STAIN TINTING SYSTEM

(71) Applicant: Valspar Sourcing, Inc., Minneapolis, MN (US)

(72) Inventors: Stephen M. Korenkiewicz, Lake Zurich, IL (US); Mark R. Coward, Jeffersonville, IN (US); David Y. Lee, Jersey City, NJ (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,594

(22) Filed: Apr. 2, 2015

(65) Prior Publication Data

US 2015/0209744 A1    Jul. 30, 2015

Related U.S. Application Data

(60) Continuation of application No. 13/397,383, filed on Feb. 15, 2012, now Pat. No. 9,010,386, which is a division of application No. 12/141,006, filed on Jun. 17, 2008, now Pat. No. 8,141,599.

(51) Int. Cl.
*B01F 13/10* (2006.01)
*C09D 7/00* (2006.01)
(Continued)

(52) U.S. Cl.
CPC .............. *B01F 13/1061* (2013.01); *B01F 3/08* (2013.01); *B01F 13/1055* (2013.01); *C09D 7/007* (2013.01); *C09D 7/14* (2013.01); *B01F 2003/0884* (2013.01); *B01F 2215/005* (2013.01)

(58) Field of Classification Search
CPC ........ C09D 7/14; C09D 7/007; B01F 13/1055
USPC ......... 141/9, 69, 100–105; 700/239; 106/456, 106/493, 499
See application file for complete search history.

(56) References Cited

U.S. PATENT DOCUMENTS

RE21,427 E    4/1940 McKinney et al.
2,787,402 A   4/1952 Stiner et al.
(Continued)

FOREIGN PATENT DOCUMENTS

EP   0 427 497 A1   5/1991
EP   1 331 249 A1   7/2003
(Continued)

OTHER PUBLICATIONS

"Accutinter 2000 Automatic Colorant Dispenser", Specification Sheet, 2 pages, downloaded from the Fluid Management Inc. website on Feb. 20, 2008 at: http://www.fluidman.com/pdf/ACCU2000_SpecSheet.pdf.
(Continued)

*Primary Examiner* — Timothy L Maust
(74) *Attorney, Agent, or Firm* — IPLM Group, P.A.

(57) ABSTRACT

White-pigmented and unpigmented base paints and stains are custom-tinted using an automated colorant dispenser having a minimum fluid dispensing quantity less than 0.01 fluid ounce (<0.3 cm$^3$) and a set of colorants including a green-hued colorant having a color strength greater than that of a comparison colorant containing 12 wt. % PG7 pigment, a blue-hued colorant having a color strength greater than that of a comparison colorant containing 12 wt. % PB15:2 pigment, a red-hued colorant having a color strength greater than that of a comparison colorant containing 17 wt. % PR209 pigment and a magenta-hued colorant having a color strength greater than that of a comparison magenta-hued colorant containing 7 wt. % PR122 pigment. Light pastel tints in small containers and strong colors in large containers may be prepared without requiring the use of additional colorants having the same general hue and lower color strength.

25 Claims, 4 Drawing Sheets

(51) Int. Cl.
*C09D 7/14* (2006.01)
*B01F 3/08* (2006.01)

(56) References Cited

U.S. PATENT DOCUMENTS

| | | | |
|---|---|---|---|
| 2,796,194 | A | 6/1957 | Willis et al. |
| 2,848,019 | A | 8/1958 | Corbin et al. |
| 2,878,135 | A | 3/1959 | Willis |
| 2,932,580 | A | 4/1960 | Clark et al. |
| 2,951,617 | A | 9/1960 | De Brock |
| 3,483,009 | A | 12/1969 | Willis |
| 3,497,374 | A | 2/1970 | Nix |
| 3,639,325 | A | 2/1972 | Marion |
| 3,851,798 | A | 12/1974 | Miller |
| 4,089,699 | A | 5/1978 | Blackburn et al. |
| 4,741,781 | A | 5/1988 | DeWitte |
| 4,909,852 | A | 3/1990 | Atkinson |
| 5,401,313 | A | 3/1995 | Supplee et al. |
| H1506 | H | 12/1995 | Beretta |
| 5,493,840 | A | 2/1996 | Cane |
| 5,814,144 | A | 9/1998 | Coutts et al. |
| 5,938,080 | A | 8/1999 | Haaser et al. |
| 5,985,987 | A | 11/1999 | Adolfsson et al. |
| 6,052,195 | A | 4/2000 | Mestha et al. |
| 6,081,253 | A | 6/2000 | Luke et al. |
| 6,488,760 | B1 | 12/2002 | Binns et al. |
| 6,531,537 | B2 | 3/2003 | Friel et al. |
| 6,637,471 | B2 | 10/2003 | Luehrsen et al. |
| 6,701,977 | B2 | 3/2004 | Taylor et al. |
| 6,740,154 | B2 | 5/2004 | Pace et al. |
| 6,957,672 | B2 | 10/2005 | Taylor et al. |
| 6,969,190 | B1 | 11/2005 | McClain et al. |
| 7,018,458 | B2 | 3/2006 | Knott et al. |
| 7,065,429 | B1 | 6/2006 | McClain et al. |
| 7,086,776 | B2 | 8/2006 | Adams |
| 7,132,470 | B2 | 11/2006 | McClain et al. |
| 7,250,464 | B2 | 7/2007 | Friel et al. |
| 7,318,864 | B2 | 1/2008 | Reisacher et al. |
| 7,339,000 | B1 | 3/2008 | McClain et al. |
| 7,659,340 | B2 | 2/2010 | Coward et al. |
| 7,690,405 | B2 | 4/2010 | Miller et al. |
| 7,698,021 | B2 | 4/2010 | Hughes et al. |
| 7,865,264 | B2 | 1/2011 | Hughes et al. |
| 7,919,546 | B2 | 4/2011 | Trevino et al. |
| 8,042,578 | B2 | 10/2011 | Post et al. |
| 8,528,605 | B2 | 9/2013 | Smith |
| 9,010,386 | B2 * | 4/2015 | Korenkiewicz ..... B01F 13/1055 106/493 |
| 2005/0038557 | A1 | 2/2005 | Friel et al. |
| 2006/0076080 | A1 | 4/2006 | Salas |
| 2006/0087914 | A1 | 4/2006 | Eckart, Jr. |
| 2006/0152745 | A1 | 7/2006 | Sanger |
| 2007/0095421 | A1 | 5/2007 | Page |
| 2007/0221531 | A1 | 9/2007 | Coughlin |
| 2007/0299196 | A1 | 12/2007 | Ohkoshi et al. |
| 2008/0051936 | A1 | 2/2008 | Lindblom |
| 2008/0187708 | A1 | 8/2008 | Decker et al. |
| 2008/0305241 | A1 | 12/2008 | Trevino, III et al. |
| 2008/0314285 | A1 | 12/2008 | Deroover |
| 2010/0113685 | A1 | 5/2010 | Coward et al. |

FOREIGN PATENT DOCUMENTS

| | | |
|---|---|---|
| WO | WO 93/09187 | 5/1993 |
| WO | WO 2006/102011 A1 | 9/2006 |

OTHER PUBLICATIONS

"Accutinter 1500 Automatic Colorant Dispenser", Specification Sheet, 2 pages, downloaded from the Fluid Management Inc. website on Feb. 20, 2008 at:http://www.fluidman.com/pdf/AT1500_SpecSheet.pdf.
"Accutinter 7000 Automatic Colorant Dispenser", Specification Sheet, 2 pages, downloaded from the Fluid Management Inc. website on Feb. 20, 2008 at: http://www.fluidman.com/pdf/ACCU7000_SpecSheet.pdf.
"The response to highest demands! BASF pigments for mixing systems", Product Brochure downloaded from the BASF website on Feb. 20, 2008 at: http://www.basf.pl/_itemserver/pdfy/EVP_1706e_Pigments_for_mixing_systems_-_the_response_to_highest_demands.pdf.
"More flexibility with Xfast®!", Product Brochure, 8 pages, downloaded from the BASF website on Feb. 21, 2008; a current and apparently similar brochure is at: http://www.basf.pl/_itemserver/pdfy/EVP_3606e_More_flexibility_with_Xfast_-_the_stir-in_class_for_transparent_wood_glazes.pdf.
"Color Fusion™ A", Product Brochure, 2 pages, downloaded from the CPS Color website on Feb. 19, 2008 at: http://www.cpscolor.com/inter/render.do?_rs=/path=3224,3231/5921.
"Monicolor™ A", Product Information Sheet, 1 page, downloaded from the CPS Color website on Feb. 19, 2008; a current and apparently similar brochure is at: http://www.cpscolor.com/inter/render.do?_rs=/path=3224,3231/5921.
"Monicolor™ F", Product Information Sheet, 2 pages, downloaded from the CPS Color website on Feb. 19, 2008; a current and apparently similar brochure is at:http://www.cpscolor.com/inter/render.do?_rs=/path=3224,3231/5921.
"Monicolor™ C", Product Information Sheet, 2 pages, downloaded from the CPS Color website on Feb. 19, 2008, ; a current and apparently similar brochure is at: http://www.cpscolor.com/inter/render.do?_rs=/path=3224,3231/5921.
"Hydrasperse™ D", Product Information Sheet, 2 pages, downloaded from the CPS Color website on Feb. 19, 2008 at: http://www.cpscolor.com/inter/render.do?_rs=/path=3224,3231/5921.
"Corob Tatocolor™", Product Brochure, 2 pages, downloaded from the CPS Color website on Feb. 19, 2008; a current and apparently similar brochure can be found at: http://www.cpscolor.com/inter/render.do?_rs=/path=3224,3238,5687/5687.
Corporate Brochure, 4 pages, downloaded from the CPS Color website on Feb. 19, 2008 at: http://www.cpscolor.com/inter/render.do?_rs=/path=11/11&pos=11.
"Equipment Overview Brochure", 2 pages, downloaded from the CPS Color website on Feb. 19, 2008 at: http://www.cpscolor.com/inter/render.do?_rs=/path=3224,3238/3238&pos=3224.
"Corob™ D600", Product Brochure, 2 pages, downloaded from the CPS Color website on Feb. 24, 2008 at: http://www.cpscolor.com/inter/render.do?_rs=/path=3224,3238,5823/5823.
"Automated Paint Machine™", Information Sheet, 1 page, downloaded from the MicroBlend Technologies website on Aug. 30, 2007 at: http://www.microblendtechnologies.com/mb/index.php?c=16.
"MicroBlend Color Science: How tomorrow will be painted", Product Information Sheet, 2 pages, downloaded from the MicroBlend Technologies website on Aug. 30, 2007 at: http://www.microblendtechnologies.com/mb/index.php?c=20.
"Sample Dispensing System", Specification Sheet, 2 pages, downloaded from the Fluid Management Inc. website on Feb. 21, 2008 at: http://www.fluidman.com/pdf/Sample_Dispenser_SpecSheet.pdf.
"Corob Modula HF", Specification Sheet, 2 pages, downloaded from the CPS Color website on Feb. 19, 2008 at: http://www.cpscolor.com/inter/render.do?_rs=/path=4985,3335,5638/5639.
"Coltec, Maximum customization", Information Sheet, 2 pages, downloaded from the CPS Color website on Feb. 19, 2008; a current and apparently similar brochure can be found at: http://www.cpscolor.com/inter/render.do?_rs=/path=3224,3231,5921/5921.
"Hostaperm® Red D2G 70 LV 2647, Hostaperm® Red D3G 70 LV 2884", 8 pages, downloaded on Feb. 20, 2008 from the Clariant Pigments and Additives website, and available at: http://pa.clariant.com/pa/e2wtools.nsf/lookupdownloads/HostapermRedD2G70-3.pdf/$File/HostapermRedD2G70-3.pdf.
Herbst, W. et al., "Industrial Organic Pigments: Production, Properties, Applications", Wiley-VCH, Third Edition, pp. 464-469 (2004).
"Sandpiper Pump Characteristics (2014).pdf" downloaded from: http://www.sandpiperpump.com/sites/sandpiperpump.com/files/documents/SP_PumpSelectionChart1.pdf.
"SPX32 High Performance Hose Pumps (2003).pdf" downloaded from: http://www.watson-marlow.co.za/pdfs-global/wd-spx32-us-01.pdf.

(56) References Cited

OTHER PUBLICATIONS

Resene, Point of sale tinting systems—the 6th decade of use a user's perspective, 6 pages (dated Jun. 16, 2015 with asserted 2004 Version Date).

Resene, Architects memos (2009), downloaded from the Internet Archive capture for Feb. 13, 2009 at: https://web.archive.org/web/20090213085243/http://resene.co.nz/archspec/archmemo/memoindx.htm.

Resene, Architects memos—Technical information (2010), downloaded from the Internet Archive capture for Sep. 24, 2010 at: https://web.archive.org/web/20100924011102/http://www.resene.co.nz/archspec/archmemo/memoindx.htm.

Resene, Architects memos—Technical information (2011), downloaded from the Internet Archive capture for May 19, 2011 at: https://web.archive.org/web/20110519162622/http://www.resene.co.nz/archspec/archmemo/memoindx.htm.

Resene, Point of Sale Tinting Systems—the 6th Decade of Use a User's Perspective, 13 page PDF HTM format document downloaded format from the Internet Archive capture for Oct. 15, 2011 at: https://web.archive.org/web/20111015121748/http://resene.co.nz/archspec/archmemo/point_of_sale_tinting.htm.

Resene, Point of Sale Tinting Systems—the 6th Decade of Use a User's Perspective, 5 page PDF with May 4, 2011 Document Properties Created Date, downloaded from the Internet Archive capture for Dec. 8, 2011 at: https://web.archive.org/web/20111208213738/http://resene.co.nz/archspec/archmemo/Point_of_sale_tinting.pdf.

Resene, Who is Resene?, Stipplecote to SpaceCote and beyond—Resene product development, 20 pages (2006).

Resene Cool Colours, Keep your cool . . . with Resene Cool Colours, 2 pages (2007).

Resene Total Colour System, BS5252 colour range, 5 pages (2008).

Resene Total Colour System, BS5252 colour range, 5 pages (2014).

Resene Roof Paint Systems, 5 pages (2004).

Response to Comments on Proposed Revisions to Standard for Paints and Coatings (GS-11) Proposed Revisions for Public Comment, pp. 1-49 (Dec. 6, 2007).

The Difference Between Primer and Undercoat, PaintPRO, vol. 3, No. 5, 2 pages (2001).

Arctic Infrared Reflective Pigments, Pigments for Coatings, The Shepherd Color Company, 2 pages (2007).

Introduction to IR, Reflective Pigments, 5 pages (Aug. 2005).

Colors to go—Xfast® POS, BASF The Chemical Company, 6 pages (2007).

Cool down your paints, BASF The Chemical Company, 8 pages (2008).

\* cited by examiner

EXPANDED COLOR SPACE ARCHITECTURAL PAINT AND STAIN TINTING SYSTEM

CROSS REFERENCE TO RELATED APPLICATION

This application is a continuation of U.S. application Ser. No. 13/397,383 filed Feb. 15, 2012, which in turn is a divisional of U.S. application Ser. No. 12/141,006 filed Jun. 17, 2008, now U.S. Pat. No. 8,141,599 B2, both entitled EXPANDED COLOR SPACE ARCHITECTURAL PAINT AND STAIN TINTING SYSTEM, the disclosures of which are incorporated herein by reference.

FIELD

This invention relates to point-of-sale customized-color architectural paint and stain tinting systems, such as those used in retail paint stores to make custom-tinted house paints or stains.

BACKGROUND

Architectural paint and stain manufacturers typically distribute premixed paints and stains in a small number of popular colors. To accommodate consumer desires and enable matching of existing painted or stained surfaces, architectural paint and stain manufacturers typically also distribute a set of tintable base paints or stains and several concentrated colorants. These are combined in point-of-sale outlets using colorant dispensing and shaker mixing equipment to make small batch lots of custom-tinted paint or stain in a much larger array of colors than the limited colors available in premixed products.

Owing in part to industry custom and the available colorant dispensing equipment, the custom color systems from different paint or stain manufacturers tend to have somewhat similar components. For example, a typical custom color paint system may employ several (e.g., 2 to 4) tintable base paints ranging for example from a bright white base intended to accept at most a small quantity of colorant (viz., having a relatively small available headspace in the base paint container), to a relatively unpigmented clear base intended to accept a much larger quantity of colorant (viz., in a container initially containing for example about 9-10% less base than the bright white base and consequently having greater available headspace for colorant addition). Base paints or stains may employ various binders (e.g., natural or synthetic resins), binder forms (e.g., solution polymers or latex polymers) and vehicles (e.g., solvent-base or waterborne versions), and may provide various dried surface finishes (e.g., matte, semi-gloss or gloss finishes). Some manufacturers also sell colored base paints (e.g. a red, a blue and yellow colored base) which are intended to be combined with additional colorant(s) when one coat hiding power is desired for strongly-tinted custom paint shades.

Colorants may for example be volumetrically metered from a multiple-colorant manually-operated dispensing station, with 12 paint colorants typically being employed in paint tinting colorant dispensing stations for the U.S. market, and more (e.g., 16 or 24 colorants) sometimes being employed in other markets. The dispensing station may for example include an individual dispensing canister for each colorant, and each dispensing canister may for example include a manually-movable piston whose stroke has been indexed to dispense colorant in minimum $\frac{1}{48}$ fluid ounce (0.62 cm$^3$) or $\frac{1}{96}$ fluid ounce (0.31 cm$^3$) increments. For example, a manually-operated dispensing station is available from CPS Color Equipment, Inc. as the COROB™ D50 dispenser. It accepts up to 24 colorant canisters and has a minimum $\frac{1}{48}$ fluid ounce dispensing capacity. Using such manual equipment, it is difficult accurately to tint small batch volumes. For example, paint stores may be reluctant to sell custom-tinted paints in 1 quart or 1 liter containers and instead may insist on selling only larger quantities such as containers holding at least 1 gallon or 4 liters.

In recent years, point-of-sale outlets have begun to employ automated colorant dispensing machines capable of dispensing colorants in smaller minimum quantities, e.g., in $\frac{1}{192}$ fluid ounce (0.153 cm$^3$), $\frac{1}{384}$ fluid ounce (0.077 cm$^3$) or $\frac{1}{1024}$ fluid ounce (0.029 cm$^3$) minimum dispensing quantities. This has enabled point-of-sale preparation of custom-tinted paints and stains in smaller containers than those previously employed.

Some colorants are made and sold by paint or stain manufacturers, and others are available from specialty colorant suppliers. For example, CPS Color Equipment, Inc. sells the COLOR FUSION™ A (8, 10 or 12 colorants), COLTEC™ (12-16 colorants) and MONICOLOR™ C (16 colorants) lines of pigment dispersions for use in point-of-sale paint tinting applications.

In paint factories, high solids content colorant dispersions or surface-treated pigments may be dispensed gravimetrically into paint batches to prepare premixed paints. For example, CPS Color Equipment, Inc sells the HYDRASPERSE™ D line of pigment dispersions, and BASF Corporation sells the XFAST™ line of powdered paint pigments.

SUMMARY OF THE INVENTION

Many existing custom-tint point-of-sale paint tinting systems involve an undesirably large number of base paints or colorants. This increases inventory levels and stocking complexity (viz., through a proliferation of Stock Keeping Units or SKUs), and may pose waste disposal problems when slower-selling base paints or colorants have not been consumed before their shelf lives expire.

The shades imparted by earth-tone colorants are important to many customers. Attaining light tints (e.g., pastels) using these and other colorants may require only a very small colorant addition, especially when preparing small batch volumes. Strong (viz., highly tinted) colors are also important to many customers. Depending on the desired hue, some strong colors may be easier to attain than others. For example, strong yellows may require less colorant addition than may be the case when making strong reds, blues or greens. Often it will not be feasible simply to add more colorant owing to the limited available headspace within the chosen base container and a desire to avoid unduly affecting the overall properties of the finished tinted product through excessive dilution. Highly concentrated colorants might be employed, but doing so could also make it difficult to use the same colorants to prepare light pastel tints. Some current paint color systems rely on a combination of uncolored and colored bases to provide both light pastel tints and strong colors with adequate hiding power. Other systems employ both less concentrated and more concentrated colorants having the same or similar hues.

We have found that by employing an array of appropriately concentrated colorants and a suitably high precision automated colorant dispenser, we can provide a point-of-sale custom color paint or stain system having a low number of bases and colorants, and having the capability to provide custom-tinted paints or stains in a wide gamut array of tints ranging from light pastel tints to strong colors. The invention thus provides, in one aspect, a point-of-sale custom color system for tinting white-pigmented and unpigmented base paints and stains, the system comprising an automated colorant dispenser having a minimum fluid dispensing quantity less than 0.01 fluid ounce (<0.3 cm$^3$) for placing colorant into the base paint or stain, the dispenser providing an array of colorants including:

1. white colorant,
2. black colorant,
3. yellow-hued colorant,
4. green-hued colorant having a color strength (measured as described below) greater than that of a comparison colorant containing 12 wt. % PG7 pigment,
5. blue-hued colorant having a color strength greater than that of a comparison colorant containing 7 wt. % PB15:2 pigment, and
6. red-hued colorant having a color strength greater than that of a comparison colorant containing 17 wt. % PR209 pigment, wherein said green-hued or blue-hued colorant is dispensed into the base paint or stain whenever a green-hued or blue-hued tint is required.

The invention provides, in another aspect, a method for point-of-sale custom paint or stain tinting, the method comprising the step of dispensing colorant into white-pigmented or unpigmented base paint or stain using an automated colorant dispenser having a minimum fluid dispensing quantity less than 0.01 fluid ounce (<0.3 cm$^3$) and an array of colorants including white colorant, black colorant, yellow-hued colorant, green-hued colorant having a color strength greater than that of a comparison colorant containing 12 wt. % PG7 pigment, blue-hued colorant having a color strength greater than that of a comparison colorant containing 7 wt. % PB15:2 pigment, and red-hued colorant having a color strength greater than that of a comparison colorant containing 17 wt. % PR209 pigment, wherein said green-hued or blue-hued colorant is dispensed into the base paint or stain whenever a green-hued or blue-hued tint is required.

The colorants, and especially the green-hued and blue-hued colorants, desirably are not too dilute and not too concentrated. The system and method may be configured so that individual colorants within the system provide both light pastel tints in small containers and strong colors in large containers, and without requiring the use of additional colorants having the same general hue and lower strength to make light pastel tints. The disclosed system and method may free up otherwise dedicated dispenser circuits, thereby permitting the addition of specialty colorants or other fluid products to an array of materials intended to be mixed with the base paints. In an especially preferred embodiment, the overall number of base paints and stains is less, the overall number of colorants is less and the gamut is wider than in conventional color systems dispensed using manually-operated dispensing stations. This can reduce inventory complexity, space and cost requirements.

BRIEF DESCRIPTION OF THE DRAWING

Like reference symbols in the various figures of the drawing indicate like elements. The elements in the drawing are not to scale.

DETAILED DESCRIPTION

Figure 1:
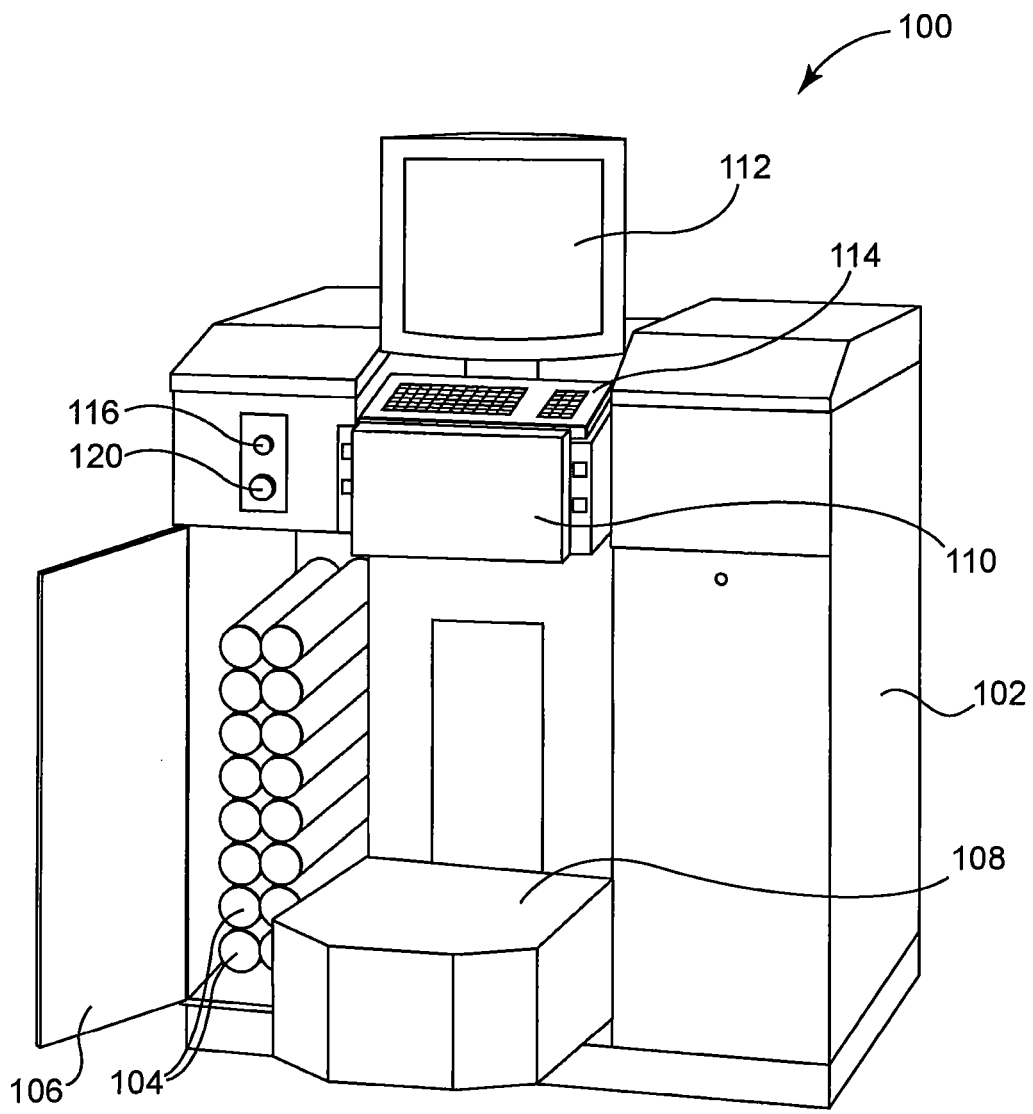
FIG. 1 is a perspective view of one embodiment of the disclosed paint mixing system.

Unless the context indicates otherwise the following terms shall have the following meaning and shall be applicable to the singular and plural:

The terms "a," "an," "the," "at least one," and "one or more" are used interchangeably. Thus, for example, a colorant composition that contains "a" pigment means that the coating composition may include "one or more" pigments.

The terms "architectural paints" and "architectural stains" respectively mean paints and stains for use on interior or exterior walls, trim, floors, ceilings or furniture.

The term "automated colorant dispenser" means a dispenser for paint or stain colorants that is controlled or controllable via electronically-regulated precision pumps or other electronically-regulated fluid flow management devices so as to meter quantities of one or more fluid colorants into a base paint or stain container and thereby facilitate preparation of tinted paints or stains whose tints are selected from an array of tints. The amounts and types of colorants selected by such an automated colorant dispenser will optionally and preferably also be controlled using software and a suitable database.

The terms "blue-hued", "green-hued" and "red-hued" respectively refer to the blue, green and red principal hues in the Munsell color system.

The term "color strength" refers the value obtained using Datacolor TOOLS™ software and a Datacolor SPECTRAFLASH™ SF300 or similar spectrophotometer to measure the color strength of a colorant or paint sample applied using a 4 mil (0.1 mm) BIRD™ bar applicator to a BYK-GARDNER™ plain white chart, and using a D65 illuminant, CIE 1964 10° Standard Observer angle and reflectance mode.

The term "low VOC" when used with respect to a paint or stain means that the paint or stain when in liquid form contains less than about 10 wt. % volatile organic compounds, more preferably less than about 7% volatile organic compounds, and most preferably less than about 4% volatile organic compounds based upon the total liquid coating composition weight.

The term "minimum fluid dispensing quantity" means the smallest amount, expressed on a volumetric basis, of liquid colorant that can reliably be dispensed by an automated colorant dispenser. In case the dispenser controls the weight rather than volume of dispensed colorant, the phrase "minimum fluid dispensing quantity" means the mass of fluid corresponding to a recited volumetric amount. Dispenser reliability may be evaluated visually, by preparing a series of custom-tinted paint batches with the same tint recipe and comparing the appearance of painted samples made using the batches to ascertain if any batch-to-batch differences in appearance can be observed by an average human observer. Dispenser reliability may also be evaluated quantitatively, using for example the CIELAB color difference formula $\Delta E=[\Delta L^2+\Delta a^2+\Delta b^2]^{1/2}$ and selecting a dispenser which can provide batch-to-batch variations of 0.5 $\Delta E$ units or less.

The term "point-of-sale outlet" means a site at which custom-mixed paint or stain is tinted and mixed in small batch lots (e.g., one quart, one liter, one gallon, four liter, five gallon or 20 liter containers, corresponding to containers from about 0.9 to 20 L) for sale to end-users (e.g., paint contractors, builders and homeowners). Representative point-of-sale outlets include retail paint stores, hardware stores, building supply stores (including warehouses), and distribution centers.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

When used with respect to a component which may be found in a mixture, the term "substantially free of" means containing less than about 5 wt. % of the component based on the mixture weight.

The recitation of a numerical range using endpoints includes all numbers subsumed within that range (e.g., 1 to 5 includes 1, 1.5, 2, 2.75, 3, 3.80, 4, 5, etc.).

FIG. 1 shows a perspective view of one embodiment of the disclosed paint mixing system 100. A cabinet 102 holds replaceable colorant canisters such as canisters 104 behind access door 106. Base paint or stain containers may be placed on stage 108 where they may receive colorant from dispensing nozzles located in dispensing head 110. A monitor 112 and keyboard 114 permit information and commands to be entered into system 100. A barcode reader (not shown in FIG. 1) may be used to read information from paint sample cards or paint containers to assist and controlling the system. A power button 116 and emergency off button 120 may be used to start and stop system 100.

Figure 2A:
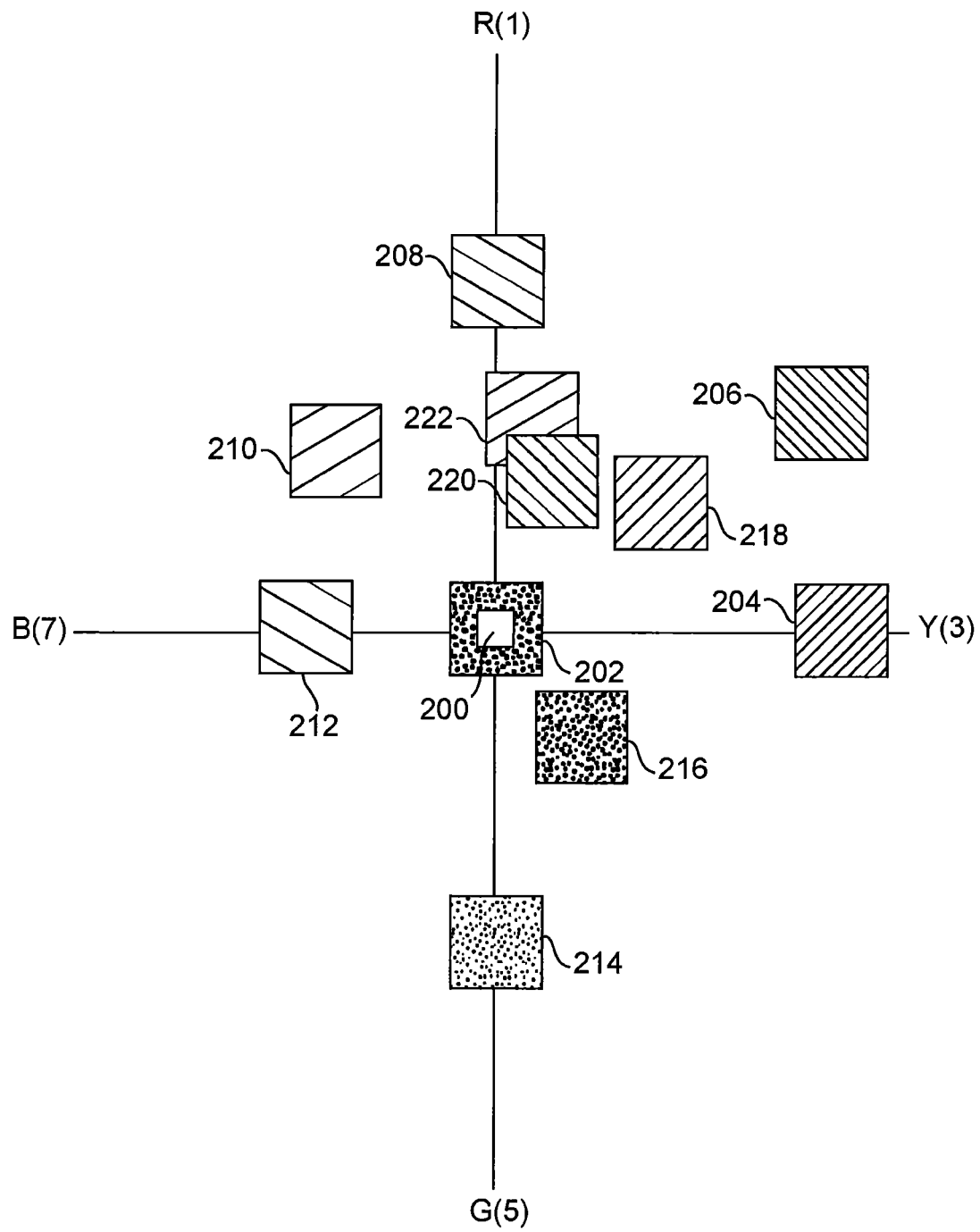
FIGS. 2a through 2c are schematic color space diagrams.

FIG. 2a shows a schematic illustration of hue and color strength for a first paint colorant system, depicted in a color space similar to but not necessarily matching a Munsell color space. The plot is in two dimensions, and except for white colorant 200 and black colorant 202, value ratings (darkness to lightness ratings) are not depicted. The colorants shown are approximately located in the color space, with the large individual colorant regions shown being merely illustrative and not defining limits for individual colorants whose hues and color strengths may differ from those shown. Colorants with visibly noticeable hues in the depicted color space include higher color strength colorants such as yellow 204, medium yellow 206, red 208, magenta 210, blue 212 and green 214, and lower color strength colorants such as raw umber 216, yellow oxide 218, brown oxide 220 and red oxide 222.

Figure 2B:
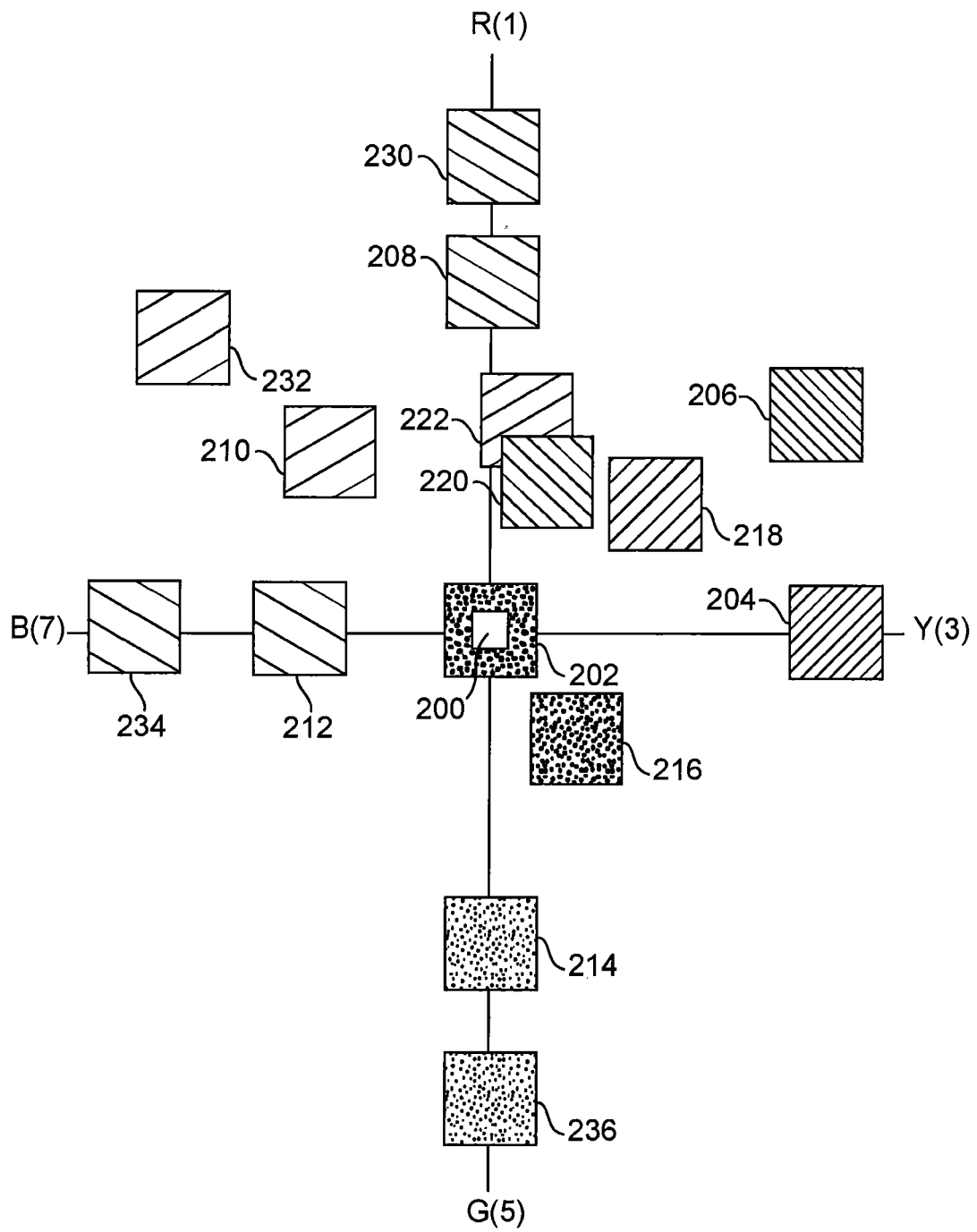

FIG. 2b shows a schematic illustration for a second paint colorant system which is similar to the first color system but which adds higher color strength colorants in the form of red 230, magenta 232, blue 234 and green 236. This enables the preparation of stronger paint colors in an expanded gamut of shades, but employs lower color strength colorants such as red 208, magenta 224, blue 212 and green 214 to make light pastel tints, especially in smaller containers. In a system such as that shown in FIG. 2b, the hues of lower color strength colorants may differ from those of the corresponding higher color strength colorants. For example, blue colorant 212 might be made using a PB15:4 pigment and blue colorant 234 might be made using a PB15:3 pigment, and green colorant 214 might be made using a PG36 pigment and green colorant 236 might be made using a PG7 pigment. This system uses a larger number of colorants (16 rather than 12) compared to the system in FIG. 2a.

Figure 2C:
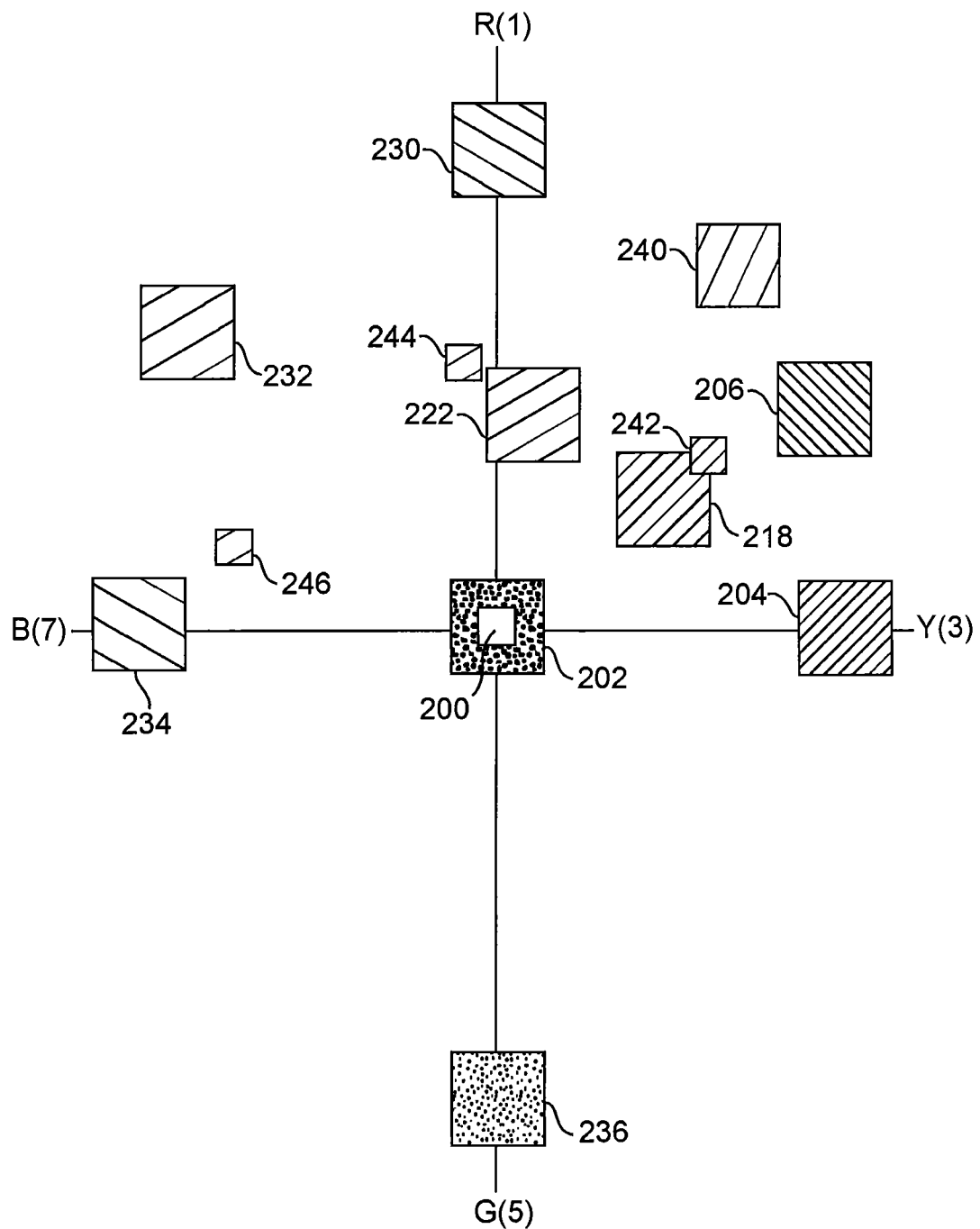

FIG. 2c shows a schematic illustration for a third paint colorant system. The red 208, magenta 210, blue 212, green 214, raw umber 216 and brown oxide 220 colorants used in FIG. 2a and FIG. 2b are no longer employed. Automatically-metered precise small amounts of the red 230, magenta 232, blue 234 and green 236 colorants may instead be employed to make light pastel tints embodying these hues. Blue-hued colorant 234 and green-hued colorant 236 are dispensed into the base paint or stain whenever a green-hued or blue-hued tint is required, and without employing lower color strength blue or green colorants.

Some individual colorants are themselves mixtures of pigments. For example, many custom color paint systems employ one or more earth-tone colorants variously referred to using names such as brown oxide, raw umber or umber. Although brown oxide colorant is sometimes referred to as being made from a single pigment (e.g., PBr7 natural iron oxide), it may actually have been made using a blend of red and yellow oxides (e.g., PR101 red iron oxide and PY42 yellow iron oxide) shaded with black pigment (e.g., PBk7 carbon black) to match a specific color target. Raw umber or umber earth-tone colorants (which may collectively be referred to as "raw umber" colorants) likewise may have been made from a blend of colored oxides and black pigment. Precisely-metered small amounts of yellow oxide 218, red oxide 222 and black 202 may be used to make earth tone tints such as brown oxide and raw umber, and may be dispensed into the base paint or stain whenever brown oxide or raw umber tints are required. The number of colorants is decreased compared to the systems in FIG. 2a and FIG. 2b, with only 10 colorants being used even though a wide gamut of shades is maintained.

An 11 to 14 colorant system with equal or better gamut and wider potential applicability than the 16 colorant system shown in FIG. 2b may also be provided by adding one or more other colorants such as orange 240 for making strong orange paints, or one or more transparent stain colorants such as transparent yellow iron oxide 242, transparent red oxide 244 or a dark, saturated magenta 246 for making tinted stains.

Other colorants which may be employed in the disclosed system and method include colorants containing both colored and white pigments to provide increased hiding power without the need for a separate colored base, fluorescent colorants, iridescent colorants, metalflake colorants, colorants for use on alkaline surfaces such as stucco and enhanced weatherability colorants. Non-colorant ingredients may be dispensed as well, including unpigmented or white-pigmented base extender(s) to permit topping up a base paint container when the amount of added colorant is less than the available container headspace.

A variety of automated paint colorant dispensers may be used in the disclosed system and method, including the ACCUTINTER™ 1500, 2000, 7000 and 8000 series machines with a 1/384 fluid ounce (0.077 cm$^3$) minimum dispensing quantity from Fluid Management, Inc., and the Sample Dispensing System with a 1/1024 fluid ounce (0.029 cm$^3$) minimum dispensing quantity from Fluid Management, Inc. Additional automated paint colorant dispensers include the COROB MODULA HF™ machine with a 1/192 fluid ounce (0.153 cm$^3$) minimum dispensing quantity from CPS Color Equipment, Inc., and the TATOCOLOR™ machine with a 1/384 fluid ounce (0.077 cm$^3$) minimum dispensing quantity from CPS Color Equipment, Inc. The chosen dispenser may for example have a minimum fluid dispensing quantity less than 0.01 fluid ounce (<0.3 cm$^3$), preferably less than 0.007 fluid ounce (<0.2 cm$^3$) and more preferably less than 0.005 fluid ounce (<0.15 cm$^3$). Dispensers with even smaller minimum dispensing quantities may be employed, e.g. less than 0.001 fluid ounce (<0.03 cm$^3$) or less than 0.0002 (<0.014 cm$^3$) minimum dispensing quantities, but such dispensers may also require longer amounts of time to prepare strong colors in large containers. To overcome this, the dispenser may be modified to provide multiple dispensing circuits for one or more colorants, e.g., a lower flow rate, lower minimum dispensing quantity circuit and a higher flow rate, higher minimum dispensing quantity circuit for at least some (e.g., the green, blue, red and magenta if used) colorants in the dispenser. These circuits may share some common components (e.g., the withdrawal line from a colorant canister, the colorant dispensing nozzle or nozzles, or nozzle cleaning devices) and may employ some unshared components (e.g., gear pumps). The somewhat increased equipment cost necessitated by such an approach will be offset by an increased fill rate when making strong colors in large containers and by a reduced or eliminated need to use separate dispensers to handle larger or smaller colorant volumes, while retaining a reduced SKU colorant set and a wide color gamut.

A variety of base paints and stains may be used in the disclosed system and method. For example, exemplary base paint sets may comprise, consist essentially of or consist of a set of white and clear (unpigmented) bases, or a set of white, midbase (intermediate white) and clear bases, or a set of white, pastel, standard color and clear bases. Colored base paints may optionally be included but preferably are not employed in order to simplify the number of required base paint SKUs. The system may also optionally include one or more stain bases. For example, the system may include exterior or interior stains such as semi-transparent or solid color (viz., opaque) stains. By way of explanation it might be noted that when a semi-transparent stain is applied to wood, the wood grain and its texture normally remains noticeable, whereas when a solid color stain is applied the grain normally becomes hidden while the texture normally remains noticeable. When a paint is applied to wood, both the wood grain and its texture normally no longer are noticeable, and a new surface which completely hides the old surface and has its own appearance is presented. This new surface may be smooth or textured.

The base paints or stains typically will be packaged in containers suitable for small batch lots. Exemplary small batch lot container sizes are about one half pint, one pint, one quart, one liter, one gallon, four liter, five gallon or 20 liter containers, corresponding to containers from about 0.24 to 20 L. Depending on the amount of pigmentation (e.g., white pigmentation) already present in a base paint or stain, the container typically will have a small amount of headspace for colorant addition. For example, a one gallon (3.79 L) white base paint container may hold about 128 oz. (3.79 L) of the base paint, with only a small headspace volume available for colorant addition. A one gallon (3.79 L) clear base paint container may for example hold about 116 oz. (3.43 L) of the base paint, with about 12 oz. (0.35 L, or about 9% of the total container volume) of headspace available for colorant addition. When additional base paints of intermediate opacity are employed, they likewise may have intermediate available headspace volumes for colorant addition. For example, a four base system may employ the white and clear base paints mentioned above, together with a pastel base whose container has about 126 oz. (3.73 L) of base paint with about 2 oz. (0.06 L) of headspace available for colorant addition, and a standard color base whose container has about 124 oz. (3.57 L) of base paint with about 4 oz. (0.12 L) of headspace available for colorant addition.

A variety of colorants may be employed in the disclosed system and method. The colorants may be may be solvent based, water based or universal colorants, with universal colorants being preferred to reduce the number of required colorant SKUs. The disclosed system and method preferably employ 8, 9, 10, 11 or 12 colorants but may employ fewer colorants if a restricted color space is acceptable, or more colorants if additional dispenser slots are available and additional colorant SKUs are acceptable. For example, the disclosed system and method may employ 6, 7, 13, 14, 15, 16, 20 or 24 colorants. Exemplary universal colorants include those described in U.S. Pat. No. 6,488,760 B1 to Binns et al. and published PCT Application No. WO 2006/102011 A1. Colorants may also be obtained from a number of suppliers including CPS Color, Inc., Evonik Industries and Color Corporation of America (a subsidiary of the present assignee). The colorants preferably are non-settling and low VOC. The colorants normally will include a binder and one or more solvents which collectively provide the "vehicle binder", sometimes referred to as merely the "binder". The types and amounts of such binders and solvents will be familiar to persons having ordinary skill in the art. The colorants normally also will include one or more pigments or dyes, with pigments usually being preferred over dyes for cost reasons. The actual pigment or dye amount in a given colorant may vary depending upon the chosen hue and chosen pigment or dye. Set out below in Table 1 are exemplary prime pigment (colored pigment) types and ranges for the green, blue, red (and if used, magenta) colorants. The amounts shown do not include inert pigments (e.g., extender filler) which may also be employed in the disclosed colorants.

TABLE 1

| Colorant | Exemplary Pigment | Wt. % Pigment | Preferred Wt. % Pigment | More Preferred Wt. % Pigment |
|---|---|---|---|---|
| Green | PG7 | >12 | 20-48 | 22-42 |
| Blue | PB15:2 | >7 | 12-28 | 13-25 |
| Red | PR254 | >17 | 29-68 | 31-60 |
| Magenta | PR122 | >7 | 12-28 | 13-25 |

The pigments listed above are not required to be employed. Any other suitable pigment may be substituted for those shown with appropriate adjustment as needed to obtain comparable color strengths. For example, the blue colorant may made using PB15:3 or PB15:4 blue, and the red colorant may be made using PR112 or PR209 red. Blends of pigments may be employed in a single colorant. For example, the red colorant may be made using a blend of PR188 red and PV19 violet.

Color strength may be measured using a Datacolor TOOLS™ software and a Datacolor SPECTRAFLASH™ SF300 or similar spectrophotometer as described above. Color strength values may also be determined according to ASTM D 3022-84 (Reapproved 2005), Standard Test Method for Color and Strength of Color Pigments by use of a Miniature Sandmill, and calculated using the Kubelka-Monk equation for tinting strength set out in Section 8.4.4 and reproduced below:

$$TS_u, \% = \frac{[(1 - R_\infty)^2 / 2R_\infty]_u}{[(1 - R_\infty)^2 / 2R_\infty]_s} \times 100$$

where:
$R_\infty$=spectral reflectance factor, expressed as a decimal fraction, of an infinitely thick layer of material (at the wavelength of maximum absorption), or, by mutual agreement, an appropriate tristimulus value
u is the colorant being measured and
s is the comparison colorant.

In this instance $R_\infty$ may be determined using CIELAB color space values and a CIE 1964 10° Standard Observer angle.

Adjustments in colorant color strength may be made based on the available minimum dispensing quantity for the chosen automated dispenser. Dispensers with very low minimum dispensing quantities preferably employ colorants at the high end of the preferred and more preferred ranges shown in Table 1, and dispensers with higher minimum dispensing quantities preferably employ colorants at the low end of the preferred and more preferred ranges shown in Table 1.

In some current colorant systems both less concentrated and more concentrated colorants having the same or similar hues are employed to provide an acceptable color gamut. If the less concentrated colorant is referred to as a single strength colorant then the more concentrated colorant may be referred to as a double, triple or quadruple strength colorant. The number of required colorant SKUs may be reduced by replacing the less concentrated and more concentrated colorants having the same or similar hues with one colorant whose color strength preferably is between about 1.7 and 4 times as strong (based on the weight percent of prime pigment) and more preferably between about 1.8 and 3.5 times as strong as the less concentrated (single strength) colorant.

In order to provide improved hiding power and avoid the need for colored base paints, the blue and green colorants may respectively include a blue or green pigment mixed with a white pigment (e.g., titanium dioxide). Exemplary white pigment amounts are about 4 to about 7 wt. % based on the total colorant weight.

The colorants may contain a variety of adjuvants including extender fillers, surfactants, thickeners, defoamers and biocides. The types and amounts of such adjuvants will be familiar to persons having ordinary skill in the art.

Some versions (e.g., some low VOC versions) of the disclosed colorants may require compatibility with paints or stains containing hydrophobically modified, ethoxylated urethane (HEUR) associative thickeners. Compatibility may be evaluated using a viscosity test carried out by adding 12 ounces of the colorant to 1 gallon of base paint containing an HEUR associative thickener, and observing the extent to which the viscosity changes. The colorant preferably will induce less than about 20 KU and more preferably less than about 15 KU viscosity decrease as measured using a BROOKFIELD™ KU-1+ Viscometer, available from Brookfield Engineering Laboratories Middleboro, Mass., USA.

The invention is further described in the following Examples, in which all parts and percentages are by weight unless otherwise indicated.

EXAMPLES

Example 1

A 10 colorant array was prepared using the pigments shown below in Table 2:

TABLE 2

| Colorant | | |
|---|---|---|
| Colorant Hue | Pigment | Wt. % Pigment |
| White | PW6 | 53.1 |
| Black | PBK7 | 9.8 |
| Green | PG7 | 20.5 |
| Blue | PB15:2 | 13.1 |
| Red | PR254 | 18 |
| Magenta | PR122 | 11.9 |
| Yellow | PY74 | 16.5 |
| Medium Yellow | PY74 + PY65 | 36.1 |
| Yellow Oxide | PY42 | 57.9 |
| Red Oxide | PR101 | 59.8 |

The blue and green colorants respectively also contained 4.5% and 6.2% titanium dioxide which provided compensatory lightness to offset the higher pigment levels. Custom-tinted paints were prepared by mixing the above colorants with pastel and clear bases using an automated colorant dispenser capable of dispensing a 1/384 fluid ounce (0.077 cm$^3$) minimum dispensing quantity. A lighter pastel green could be obtained when dispensing a 1/384 fluid ounce minimum quantity of the green colorant shown in Table 1 into 1 gallon (3.8 L) of pastel base than could be obtained when dispensing a 1/96 fluid ounce (0.31 cm$^3$) minimum quantity of a comparison single strength green colorant containing 11.5% PG7 green. A lighter pastel blue could be obtained when dispensing a 1/384 fluid ounce minimum quantity of the blue colorant shown in Table 1 into 1 gallon of pastel base compared to dispensing a 1/96 fluid ounce (0.31 cm$^3$) minimum quantity of a comparison single strength blue colorant containing 7% PB15:2 blue. Addition of 12 oz. (0.35 L) of the green or blue colorants shown in Table 1 to 1 gallon of clear base provided a darker, more saturated blue or green mass tone color than could be obtained using a 12 oz. addition of the comparison colorants. Use of the Table 1 colorants and a precision automated dispenser thus provided tinted paints in an expanded gamut colors space, while using only 10 colorants and 2 bases and employing a single green-hued or blue-hued colorant whenever a green-hued or blue-hued tint was required. A mixture of the black, red oxide and yellow oxide colorants was also dispensed into the pastel base to provide tinted pastel paints in brown oxide and raw umber tints without requiring the use of separate brown oxide or raw umber colorants.

Example 2

Triple strength versions of the magenta and blue colorants shown in Table 1 were prepared using 23.4 wt. % PR122 pigment for the magenta colorant and 25.4 wt. % PB15:2 pigment for the blue colorant. Using an automated dispenser with a 1/1024 fluid ounce (0.029 cm$^3$) minimum dispensing quantity, a lighter pastel magenta or blue could be made using the triple strength colorants and 1 gallon of pastel base, and a darker more saturated magenta or blue could be made using the triple strength colorants and 1 gallon of clear base, than could be obtained by dispensing the comparison single strength colorants using a 1/96 fluid ounce (0.31 cm$^3$) minimum quantity dispenser.

Example 3

Additional colorants for use with transparent stains were prepared using the pigments shown below in Table 3:

TABLE 3

| Colorant | | |
|---|---|---|
| Colorant Hue | Pigment | Wt. % Pigment |
| Transparent Yellow Iron Oxide | PY42 | 30 |
| Transparent Red Oxide | PR101 | 35.2 |
| Dark, Saturated Magenta | PR122 | 10.6 |

The Table 3 colorants were dispensed using an automated dispenser with a 1/384 fluid ounce (0.077 cm$^3$) minimum dispensing quantity into a clear base in amounts up to 12 oz. (0.35 L) per gallon to provide a low hiding but UV resistant transparent protective coating through which the natural grain patterns of underlying wood surfaces were visible.

Example 4

Additional colorants for use with the system shown in Example 1 were prepared using the pigments shown below in Table 4:

TABLE 4

| | Colorant | |
|---|---|---|
| Colorant Hue | Pigment | Wt. % Pigment |
| Raw Umber | PBR7 | 21.1 |
| Orange | PO74 | 12.8 |

The Table 4 colorants were dispensed in varying amounts into clear or $TiO_2$-containing bases, with the desired colorant amount depending on the desired tint and on the amount of $TiO_2$ in the chosen base. Clear bases containing no $TiO_2$ typically were mixed with about 8 to about 12 oz/gal (about 62.5 to about 93.8 mL/L) of colorant to make saturated tints. Bases containing about 1.5 lbs (0.68 Kg) of $TiO_2$ typically were mixed with about 2 to about 6 oz/gal (about 15.6 to about 46.9 mL/L) of colorant to make medium pastel tints. Bases containing about 2 lbs. (1.8 Kg) of $TiO_2$ typically were mixed with 0 to about 2 oz/gal (0 to about 15.6 mL/L) of colorant to make very light pastel tints.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. An array of paint or stain colorants, the array comprising a set of individual water based fluid colorants for point-of-sale tinting of pigmented or unpigmented base paints or stains in an automated colorant dispenser, the set comprising:
   a) white colorant,
   b) black colorant,
   c) yellow-hued colorant,
   d) green-hued colorant having a color strength greater than that of a comparison green-hued colorant containing 12 wt. % PG7 pigment,
   e) blue-hued colorant having a color strength greater than that of a comparison blue-hued colorant containing 12 wt. % PB15:2 pigment,
   f) red-hued colorant having a color strength greater than that of a comparison red-hued colorant containing 17 wt. % PR209 pigment, and
   g) magenta-hued colorant having a color strength greater than that of a comparison magenta-hued colorant containing 7 wt. % PR122 pigment.

2. The array according to claim 1 wherein the green-hued colorant has a color strength comparable to that of a comparison colorant containing about 20 to about 48 wt. % PG7 pigment.

3. The array according to claim 1 wherein the green-hued colorant has a color strength comparable to that of a comparison colorant containing about 22 to about 42 wt. % PG7 pigment.

4. The array according to claim 1 wherein the set does not include green-hued colorant having lower color strength than such comparison green-hued colorant.

5. The array according to claim 1 wherein the blue-hued colorant has a color strength greater than that of a comparison colorant containing 13 wt. % PB15:2 pigment.

6. The array according to claim 1 wherein the blue-hued colorant has a color strength greater than that of a comparison colorant containing 13 wt. % PB15:4 pigment.

7. The array according to claim 1 wherein the blue-hued colorant has a color strength comparable to that of a comparison colorant containing about 12 to about 28 wt. % PB15:2 pigment.

8. The array according to claim 1 wherein the blue-hued colorant has a color strength comparable to that of a comparison colorant containing about 13 to about 25 wt. % PB15:2 pigment.

9. The array according to claim 1 wherein the blue-hued colorant has a color strength comparable to that of a comparison colorant containing about 13 to about 25 wt. % PB15:4 pigment.

10. The array according to claim 1 wherein the set does not include blue-hued colorant having lower color strength than such comparison blue-hued colorant.

11. The array according to claim 1 wherein the red-hued colorant has a color strength greater than that of a comparison colorant containing 17 wt. % PR112 pigment.

12. The array according to claim 1 wherein the red-hued colorant has a color strength greater than that of a comparison colorant containing 17 wt. % PR254 pigment.

13. The array according to claim 1 wherein the red-hued colorant has a color strength comparable to that of a comparison colorant containing about 29 to about 68 wt. % PR209 pigment.

14. The array according to claim 1 wherein the red-hued colorant has a color strength comparable to that of a comparison colorant containing about 29 to about 68 wt. % PR112 pigment.

15. The array according to claim 1 wherein the red-hued colorant has a color strength comparable to that of a comparison colorant containing about 29 to about 68 wt. % PR254 pigment.

16. The array according to claim 1 wherein the set does not include red-hued colorant having lower color strength than such comparison red-hued colorant.

17. The array according to claim 1 wherein the magenta-hued colorant has a color strength comparable to that of a comparison colorant containing about 12 to about 28 wt. % PR122 pigment.

18. The array according to claim 1 wherein the set does not include magenta-hued colorant having lower color strength than such comparison magenta-hued colorant.

19. The array according to claim 1 wherein the set also contains yellow oxide, red oxide, raw umber and orange colorants.

20. The array according to claim 1 wherein the set also contains transparent yellow oxide and transparent red oxide colorants.

21. The array according to claim 1 wherein the set contains no more than 12 colorants.

22. The array according to claim 1 wherein the set consists of 14 colorants.

23. The array according to claim 1 wherein the colorants are low VOC colorants containing less than about 4 wt. % volatile organic compounds.

24. The array according to claim 23 wherein the colorants are also universal colorants.

25. The array according to claim 23 wherein the colorants are not universal colorants.

* * * * *